United States Patent
Macchia

(10) Patent No.: US 9,915,821 B2
(45) Date of Patent: Mar. 13, 2018

(54) DEVICE FOR MEASURING A VEHICLE

(71) Applicant: Robert Bosch GmbH, Stuttgart (DE)

(72) Inventor: Adriano Macchia, Correggio (IT)

(73) Assignee: ROBERT BOSCH GMBH, Stuttgart (DE)

( * ) Notice: Subject to any disclaimer, the term of this patent is extended or adjusted under 35 U.S.C. 154(b) by 48 days.

(21) Appl. No.: 14/901,239

(22) PCT Filed: Apr. 30, 2014

(86) PCT No.: PCT/EP2014/058932
§ 371 (c)(1),
(2) Date: Dec. 28, 2015

(87) PCT Pub. No.: WO2014/206612
PCT Pub. Date: Dec. 31, 2014

(65) Prior Publication Data
US 2016/0370577 A1 Dec. 22, 2016

(30) Foreign Application Priority Data
Jun. 26, 2013 (DE) .......... 10 2013 212 200

(51) Int. Cl.
*G02B 27/00* (2006.01)
*G03B 17/56* (2006.01)
(Continued)

(52) U.S. Cl.
CPC ........ *G02B 27/0006* (2013.01); *G03B 11/043* (2013.01); *G03B 17/08* (2013.01);
(Continued)

(58) Field of Classification Search
CPC .... G03B 11/043; G03B 17/08; G03B 17/568; G03B 2217/002; G03B 17/56;
(Continued)

(56) References Cited

U.S. PATENT DOCUMENTS

| | | | |
|---|---|---|---|
| 2014/0192410 A1* | 7/2014 | Yoshimura | B60R 11/04 359/509 |
| 2015/0201826 A1* | 7/2015 | Hsu | A61B 1/00135 600/121 |
| 2015/0246660 A1* | 9/2015 | Seedall | B60S 1/26 359/507 |

FOREIGN PATENT DOCUMENTS

| | | |
|---|---|---|
| CN | 102639363 A | 8/2012 |
| DE | 37 10 847 | 10/1987 |

(Continued)

OTHER PUBLICATIONS

Machine Translation of Foreign Patent Document (DE102005021670A1).*

*Primary Examiner* — Jie Lei
(74) *Attorney, Agent, or Firm* — Norton Rose Fulbright US LLP; Gerard Messina

(57) ABSTRACT

A device for measuring a vehicle has at least one image capturing device, that includes at least one camera having at least one light incidence region configured to allow light from an object to be captured by the camera to strike the camera through the at least one light incidence region. The device also has a device for keeping the light incidence region clean and/or for cleaning the same, that features at least one deflecting element that is movable over the light incidence region in a way that allows it to prevent the deposition of dust and dirt on the light incidence region and/or to remove dust and/or dirt from the at least one light incidence region.

12 Claims, 2 Drawing Sheets

(51) Int. Cl.
*H04N 7/18* (2006.01)
*G03B 11/04* (2006.01)
*G03B 17/08* (2006.01)

(52) U.S. Cl.
CPC ........... *G03B 17/568* (2013.01); *H04N 7/183* (2013.01); *G03B 2217/002* (2013.01)

(58) Field of Classification Search
CPC .... G03B 17/02; G03B 11/041; G03B 11/045; G02B 27/0006; G02B 27/00; G02B 23/16; G02B 23/2476; H04N 7/183; H04N 7/18; H04N 7/185; H04N 5/2171; H04N 5/2254; H04N 5/2257; H04N 5/23203
USPC ..... 359/509, 511, 508; 15/250.001, 250.002, 15/250.003, 250.04, 250.07, 250.08
See application file for complete search history.

(56) References Cited

FOREIGN PATENT DOCUMENTS

| | | |
|---|---|---|
| DE | 296 16 586 | 3/1997 |
| DE | 197 07 223 | 9/1997 |
| DE | 10 2005 021670 | 11/2006 |

\* cited by examiner

DEVICE FOR MEASURING A VEHICLE

FIELD OF THE INVENTION

The present invention relates to a device for measuring a vehicle that has at least one camera and at least one device for keeping the camera's light incidence region clean and/or for cleaning the same.

BACKGROUND INFORMATION

Devices for measuring a vehicle often have one or a plurality of cameras to record images of the vehicle to be measured. To ensure a high measurement quality, the light incidence regions of the camera(s), through which the light is incident to the camera, must be kept clean and/or be regularly cleaned to prevent dust and other impurities, such as water droplets and small stones, from adversely affecting the image quality. This is especially true of cameras whose image recording direction is vertically oriented, so that they have a horizontally configured light incidence region upon which a substantial amount of dirt and dust can accumulate.

It is arduous and time-consuming to routinely manually clean the camera(s), and the quality of the measuring results is negatively affected when the cleaning is not regularly performed due to reasons of convenience and/or forgetfulness.

SUMMARY OF THE INVENTION

It is, therefore, an object of the present invention to provide a device for measuring a vehicle that has at least one camera and that makes it readily and conveniently possible to ensure a consistently high quality of the images captured by the cameras.

An inventive device for measuring a vehicle includes at least one camera that has a light incidence region configured to allow light from an object to be captured by the camera to strike the camera through the at least one light incidence region, and at least one device for keeping the camera's light incidence region clean and/or for cleaning the same, that features at least one deflecting element that is movable over the light incidence region in a way that prevents or at least reduces the deposition of dust and/or dirt on the light incidence region and or removes dust and/or dirt that has accumulated on the at least one light incidence region.

Such a device for keeping the camera's light incidence region clean and/or for cleaning the same makes it possible for the light incidence region of the at least one camera to be readily and conveniently kept clean, respectively cleaned virtually "at the push of a button," thereby allowing the vehicle measurement and diagnostics to always be performed using a camera that has a clean light incidence region.

A specific embodiment provides that the device for keeping the camera's light incidence region clean and/or for cleaning the same be configured in a way that allows the at least one deflecting element to be movable in a rotating motion over the at least one light incidence region. A rotating movement of the deflecting element may be realized very readily, by configuring one or a plurality of deflecting elements in the form of a fan over the light incidence region, for example. A rotating movement also makes it possible to produce an air flow at a high speed over the light incidence region and thereby keep the light incidence region clean, respectively clean the same very effectively.

A specific embodiment provides that the device for keeping the camera's light incidence region clean and/or for cleaning the same be configured in a way that allows the deflecting element to be movable in a linear, respectively straightline motion over the at least one light incidence region. A linear motion permits an especially space-saving configuration for moving the deflecting element over the camera's light incidence region. Moreover, using such a device for keeping the camera's light incidence region clean and/or for cleaning the same, a plurality of cameras having one single deflecting element, which is directed one after another over the various cameras, may be kept clean, respectively cleaned.

A specific embodiment provides that the at least one deflecting element be configured mirror-symmetrically to a plane that is oriented orthogonally to the moving direction of the deflecting element.

This type of mirror-symmetrically configured deflecting element makes it possible to produce a suitable air flow over the air incidence region, both during forward, as well as return travel of the deflecting element, so that a linear movement of the deflecting element may be utilized very effectively for keeping the light incidence region clean, respectively for cleaning the same.

In an alternative specific embodiment, the deflecting element is transformable between a first configuration and at least one second configuration, the first and the second configuration being disposed, in particular mirror-symmetrically to a plane that is oriented orthogonally to the moving direction of the deflecting element. This makes it possible for the deflecting element, particularly when it executes a linear movement, to always be transformed into a configuration that is especially well suited for producing an air flow over the light incidence region of the camera. In this manner, the light incidence region of the camera is very effectively kept clean, respectively cleaned.

A specific embodiment provides that the light incidence region be configured to include at least one lens, in particular an objective lens that combines a plurality of lenses. The outermost lens of a thus formed light incidence region that is exposed to environmental influences, may be very effectively kept clean, respectively cleaned using an inventive device for keeping the light incidence region clean, respectively for cleaning the same.

The deflecting element may, in particular, be configured as an air deflecting element that is configured and disposed to produce an air flow during operation that is directed at the light incidence region. The deflecting element, configured as an air deflecting element, may, however, also be configured and disposed to perform a suction action during operation and thereby produce an air flow that is directed away from the light incidence region. Finally, the deflecting element, configured as an air deflecting element, may also be configured and disposed to produce an air flow during operation that is oriented essentially parallel to the plane of the light incidence region, in particular parallel to the plane of a lens located therein.

The device for keeping the camera's light incidence region clean and/or for cleaning the same may also include a plurality of air deflecting elements that each produce differently oriented air flows for very effectively keeping the camera's light incidence region clean, respectively for cleaning the same.

The at least one deflecting element may be moved at such a high speed that the image acquisition is not disturbed by the deflecting element. Alternatively, the image acquisition and the movement of the deflecting element are synchronized in such a way that the deflecting element does not disturb the image acquisition. In the simplest case, the device for keeping the light incidence region clean and/or for cleaning the same is only activated between the measuring operations when no image acquisition is being carried out.

In one specific embodiment, the camera and the device for keeping the camera's light, incidence region clean and/or for cleaning the same are configured in a shared housing. In this manner, the camera and, in particular, the device for keeping the camera's light incidence region clean and/or for cleaning the same may also be effectively prevented from mechanical influences that could damage the device and/or the camera.

The present invention will now be described in greater detail with reference to the drawings.

DETAILED DESCRIPTION

Figure 1:
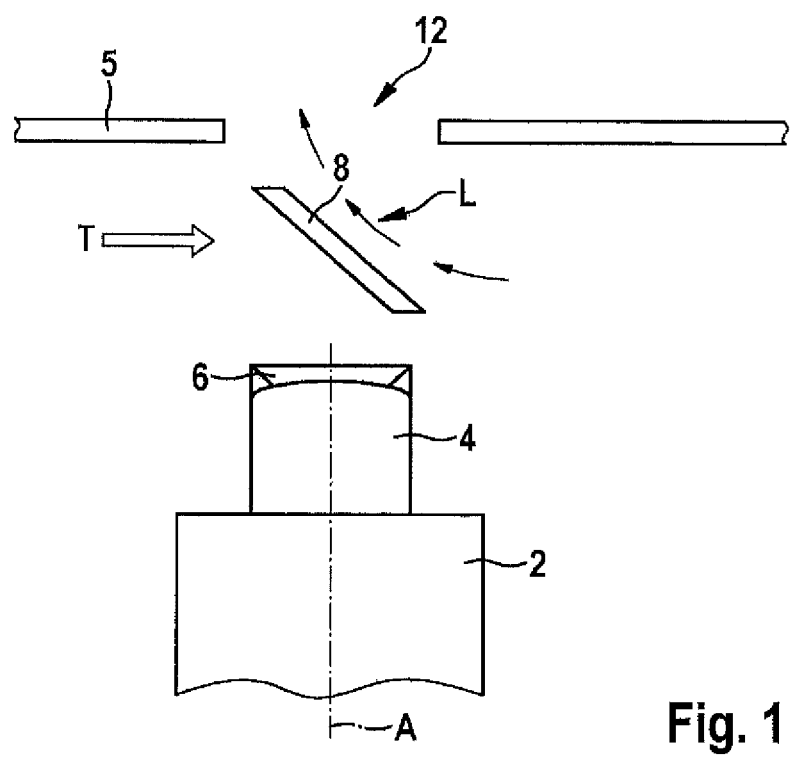
FIG. 1 shows a schematic sectional view of a first exemplary embodiment of an image capturing device according to the present invention.

The first exemplary embodiment of an image capturing device according to the present invention shown in a schematic sectional view in FIG. 1 for use in a device for measuring a vehicle has a camera 2, shown, in the lower area of FIG. 1, that has an objective lens 4 disposed on the top side of camera 2 and through which the light from the object to be recorded is incident to camera 2, and which is terminated by an outer lens 6.

Camera 2 is configured in a housing 5, only partially shown in FIG. 1, and has an upwardly open opening 12, allowing camera 2 to record images of a motor vehicle (not shown in FIG. 1) through opening 12 formed in housing 5.

In particular, when housing 5 and camera 2 are located underneath the plane of the roadway, for example, to record images of the underbody of motor vehicle 2, outer lens 6 (topmost lens in FIG. 1) of objective lens 4 is soiled over the course of time by dust and dirt, for example, in the form of dirt particles and/or water droplets, which, in particular, fall through opening 12 and accumulate on lens 6. The quality of the images recorded by camera 2 and, therefore, also of the measuring results provided by the measuring device are negatively affected.

For that reason, the image capturing device additionally has at least one deflecting element 8 in the area between outer lens 6 and opening 12 in housing 5 that is movable in a way that prevents dirt, for example in the form of dust or dirt particles and/or water droplets from falling onto lens 6, and additionally produces an air flow that streams over lens 6 in order to remove dirt from the same that is possibly already present on lens 6.

Deflecting element 8 may be configured as a blade 8 of a fan, for example, that rotates about an axis that is essentially oriented parallel to optical axis A (image recording direction) of camera 2 and/or is oriented in a direction T that is essentially oriented at a right angle to optical axis A of camera 2, and, in the process, produces an air flow that prevents dirt, for example, in the form of dust or dirt particles and/or water droplets from falling on lens 6. Additionally or alternatively, deflecting element 8, in particular when it moves at a high enough speed, is able to keep away dirt particles, that may be on the verge of falling on lens 6, from direct mechanical contact with lens 6.

Combining a rotary motion of deflecting element 8 with a translational motion T may very effectively protect lens 5 from dirt and/or clean the same very thoroughly. In particular, a plurality of side-by-side disposed cameras 2, for example, the two cameras 2 of a stereo camera assembly (not shown in the figure) may be kept clean and/or cleaned by a single deflecting element 8.

Figure 2:
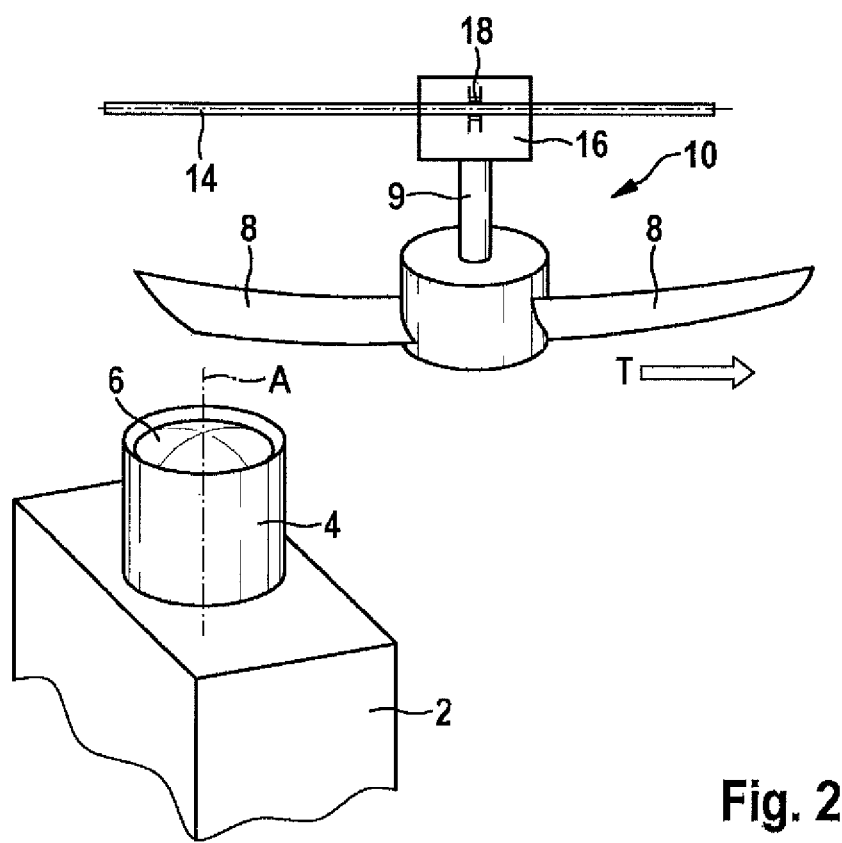
FIG. 2 shows a schematic perspective view of a camera having a device for keeping the light incidence region of a camera clean and/or for cleaning the same in accordance with a first exemplary embodiment.

FIG. 2 shows a perspective, schematic view of a configuration composed of a camera 2 having an objective lens 4 that has an outer lens 6, and a fan 10 having two deflecting elements (rotor blades) 8 that may be driven by a motor 16 in a rotating motion about a shaft 9 disposed parallel to optical axis A of camera 2, to produce an air flow L over outer lens 6 of objective lens 4 that prevents dust and other dirt particles from depositing on lens 6, respectively dust and other dirt particles, that have accumulated on lens 6, from being removed from lens 6.

Motor 16 may be configured with a threaded fitting 18 and be supported by a shaft, respectively spindle 14 that allows it, together with fan 10, to be moved translationally, essentially parallel to opening 12 in housing 55 not shown in FIG. 2, as has been described in connection with FIG. 1.

Figure 3:
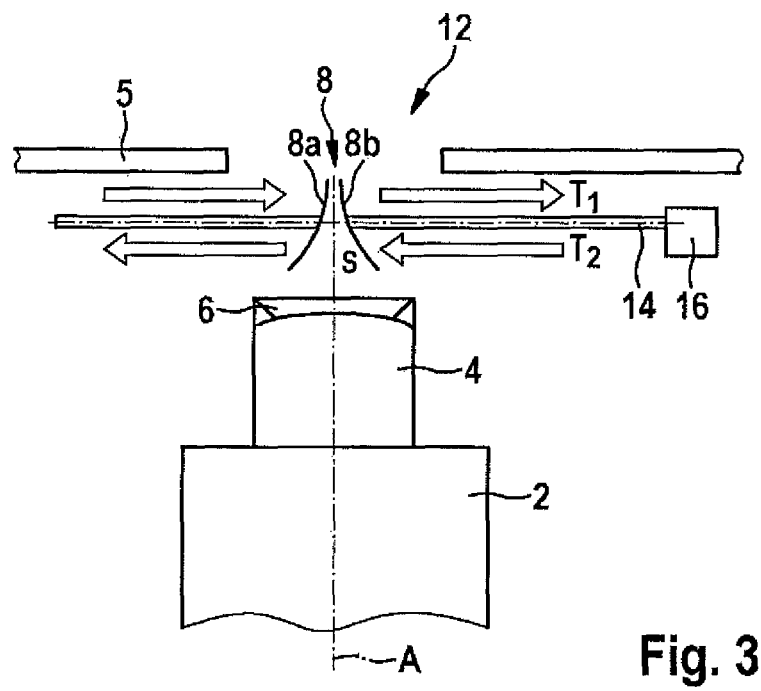
FIG. 3 shows a schematic sectional view through a second exemplary embodiment of an image capturing device according to the present invention.

FIG. 3 shows a second exemplary embodiment of an image capturing device having a device for keeping the light incidence region clean and/or for cleaning the same that has a deflecting element 8 configured as a double-sided air deflecting element 8 having a first air deflection region 8a and a second air deflection region 8b. Double-sided air deflecting element 8 is fastened by a threaded fitting 18 to a shaft, respectively spindle 14, that is rotatable by a motor 16 to move air deflecting element 8 translationally in direction $T_1$, respectively in opposite direction $T_2$ essentially perpendicularly to optical axis A of camera 2 over lens 6 of objective lens 4 of camera 2. Relative to a plane S, which is essentially oriented parallel to optical axis A of camera 2 and orthogonally to moving direction $T_1$, $T_2$ or air deflecting element 8, first air deflecting region 8a and second air deflecting region 8b are mirror-symmetric.

Due to the mirror-symmetric configuration of the two air deflecting regions 8a, 8b of air deflecting element 8, in response to the translational movement of air deflecting element 8, an air flow L is produced over lens 6 that prevents or at least reduces the depositing of dust and other dirt particles on lens 6, and which makes it possible for dust and other dirt particles, that have accumulated on lens 6, from being removed therefrom.

The configuration shown in FIG. 3 makes possible an especially compact and space-saving design of an image capturing device that features a device for keeping the light incidence region clean and/or for cleaning the same.

Figure 4:
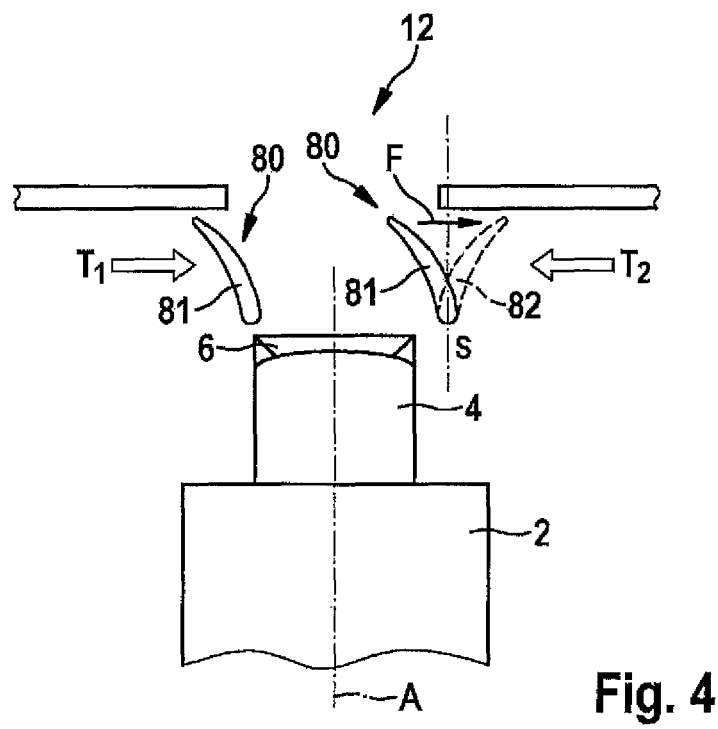
FIG. 4 shows a schematic sectional view through a third exemplary embodiment of an image capturing device according to the present invention.

FIG. 4 shows a schematic sectional view of a third exemplary embodiment, where the device for keeping the light incidence region clean, and/or for cleaning the same likewise features at least one deflecting element 80 configured as an air deflecting element that is linearly movable by a driving device (not shown) in a moving direction $T_1$, $T_2$ that is essentially oriented at a right angle to optical axis A of the camera.

Unlike the second exemplary embodiment shown in FIG. 3, in this exemplary embodiment, deflecting element 80 is not configured to be mirror-symmetric, rather to be transformable, in particular movable and/or deformable.

If deflecting element 80 moves in a first direction $T_1$ from left to right, it then takes on a first configuration 81 that is represented in FIG. 4 by the solid lines. Deflecting element 80 thereby produces an air flow over outermost lens 6 of objective lens 4 to clean the same from dust and dirt and/or to prevent dust and dirt from depositing on lens 6.

If the movement of deflecting element 80 reaches the end and reversal point thereof on the right side, deflecting element 80 folds over in a folding movement F from first configuration 81 into a second configuration 82 that is shown in FIG. 4 by a dotted line. Relative to a plane 8, which is essentially oriented orthogonally to moving direction $T_1$, $T_2$, second configuration 82 is mirror-symmetric to first configuration 81, so that deflecting element 80 likewise produces an air flow L from right to left in response to subsequent movement $T_2$ thereof that is suited for cleaning lens 6 of objective lens 4 and/or for preventing dust and dirt from depositing on lens 6.

Folding motion F always provides deflecting element 80 in each moving direction $T_1$, $T_2$ with the correct configuration for producing a suitable air flow L for cleaning lens 6, respectively for keeping it clean.

Because, unlike the second exemplary embodiment shown in FIG. 3, deflecting element 80 is not configured to be double-sided, respectively mirror-symmetric, it may be configured to have a lower weight, and drive 16 for moving deflecting element 80 may be dimensioned more simply and inexpensively.

Deflecting element 80 may be configured to automatically assume proper configuration 81, 82 upon reversal of moving direction $T_1$, $T_2$, for example, by air flow L acting on deflecting element 80, so that no additional mechanism is needed for "folding" deflecting element 80. A device 6 for keeping the light incidence region clean and/or for cleaning the same in accordance with the third exemplary embodiment, as is shown in FIG. 4, may be very readily and cost-effectively devised in this manner.

What is claimed is:

1. A device for measuring a motor vehicle, comprising:
at least one image capturing device having at least one camera having at least one light incidence region to allow light from an object to be captured by the camera to strike the camera through the at least one light incidence region; and
a motor;
wherein the image capturing device has a device for keeping the light incidence region clean and/or for cleaning the light incidence region, including at least one deflecting element which is movable over the at least one camera, that prevents or at least reduces the deposition of dust, dirt, water droplets and/or small stones, on the light incidence region, and/or to remove the dust, dirt, water droplets and/or small stones from the at least one light incidence region;
wherein the at least one deflecting element includes a rotatable fan having a plurality of blades, the fan being driven to rotate, by the motor, about an axis which is parallel to an optical axis of the at least one image capturing device, and the fan being movable translationally, by the motor, along an axis which is perpendicular to the optical axis;
wherein the fan is mounted on a spindle, the fan being moveable translationally along the spindle.

2. The device of claim 1, wherein the at least one deflecting element is movable in a rotating motion over the at least one light incidence region.

3. The device of claim 1, wherein the at least one deflecting element is transformable between a first configuration and at least one second configuration, the first and the second configuration being disposed to a plane that is oriented orthogonally to the moving direction of the deflecting element.

4. The device of claim 1, wherein the at least one light incidence region is configured to include at least one lens.

5. The device of claim 1, wherein the at least one deflecting element is configured to produce an air flow directed at the at least one light incidence region during the movement thereof.

6. The device of claim 1, wherein the at least one deflecting element is configured to produce an air flow directed away from the at least one light incidence region during the movement thereof.

7. The device of claim 1, wherein the at least one deflecting element is configured to produce an air flow oriented parallel to the at least one light incidence region during the movement thereof.

8. The device of claim 1, wherein the at least one camera and/or the device for keeping the light incidence region clean and/or for cleaning the same is disposed within a housing of the device for measuring a vehicle.

9. The device as recited in claim 1, wherein the motor is mounted to the spindle and engages the spindle to translationally move the fan.

10. A device for measuring a motor vehicle, comprising:
at least one image capturing device having at least one camera having at least one light incidence region to allow light from an object to be captured by the camera to strike the camera through the at least one light incidence region;
wherein the image capturing device has a device for keeping the light incidence region clean and/or for cleaning the light incidence region, including at least one deflecting element which is movable over the at least one camera, that prevents or at least reduces the deposition of dust, dirt, water droplets and/or small stones, on the light incidence region, and/or to remove the dust, dirt, water droplets and/or small stones from the at least one light incidence region;
wherein the at least one deflecting element is movable in a translational motion over the at least one light incidence region;
wherein the at least one deflecting element is movable, by a motor, in the translational motion over the at least one light incidence region along an axis that is perpendicular to an optical axis of the at least one image capturing device; and
where the at least one deflecting element is mounted on a spindle, the at least one deflecting element movable translationally along the spindle.

11. A device for measuring a motor vehicle, comprising:
at least one image capturing device having at least one camera having at least one light incidence region to allow light from an object to be captured by the camera to strike the camera through the at least one light incidence region; and
a motor;
wherein the image capturing device has a device for keeping the light incidence region clean and/or for cleaning the light incidence region, including at least one deflecting element which is movable over the at least one camera, that prevents or at least reduces the deposition of dust, dirt, water droplets and/or small stones, on the light incidence region, and/or to remove the dust, dirt, water droplets and/or small stones from the at least one light incidence region;

wherein the at least one deflecting element is mirror-symmetric to a plane that is oriented orthogonally to a moving direction of the deflecting element; and wherein the at least one deflecting element is translationally moveable, by the motor, along an axis that is perpendicular to an optical axis of the at least one image capturing device;

wherein the motor is mounted to a spindle and the motor engaging the spindle to translationally move the at least one deflecting element.

12. A device for measuring a motor vehicle, comprising:

at least one image capturing device having at least one camera having at least one light incidence region to allow light from an object to be captured by the camera to strike the camera through the at least one light incidence region;

wherein the image capturing device has a device for keeping the light incidence region clean and/or for cleaning the light incidence region, including at least one deflecting element which is movable over the at least one camera, that prevents or at least reduces the deposition of dust, dirt, water droplets and/or small stones, on the light incidence region, and/or to remove the dust, dirt, water droplets and/or small stones from the at least one light incidence region;

wherein the at least one deflecting element is transformable between a first configuration and at least one second configuration, the first and the second configuration being disposed mirror-symmetrically to a plane that is oriented orthogonally to the moving direction of the deflecting element; and wherein the at least one deflecting element is linearly moveable, by a driving device, in a direction that is perpendicular to an optical axis of the at least one image capturing device.

\* \* \* \* \*